May 20, 1924.
W. C. HEDGCOCK
1,494,837
ADJUSTABLE BRAKE HEAD ARRANGEMENT
Filed April 8, 1921
2 Sheets-Sheet 1
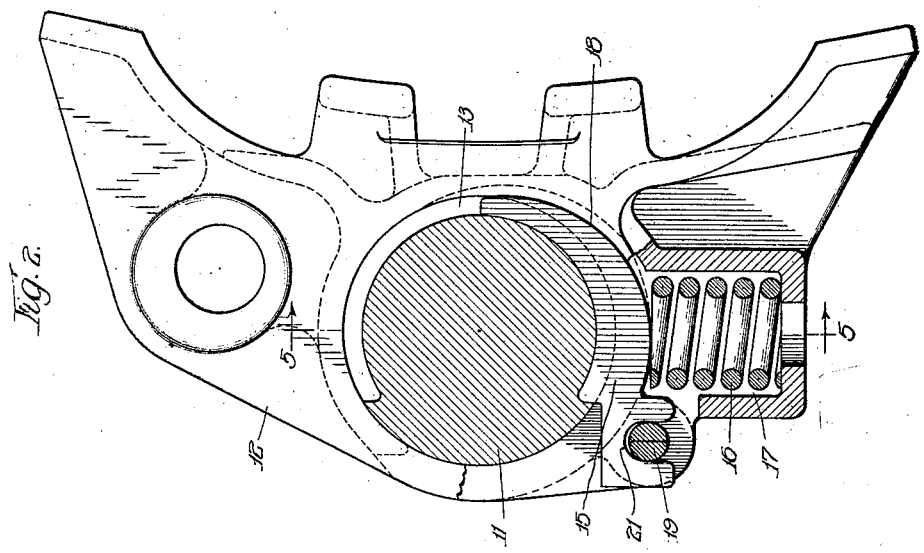
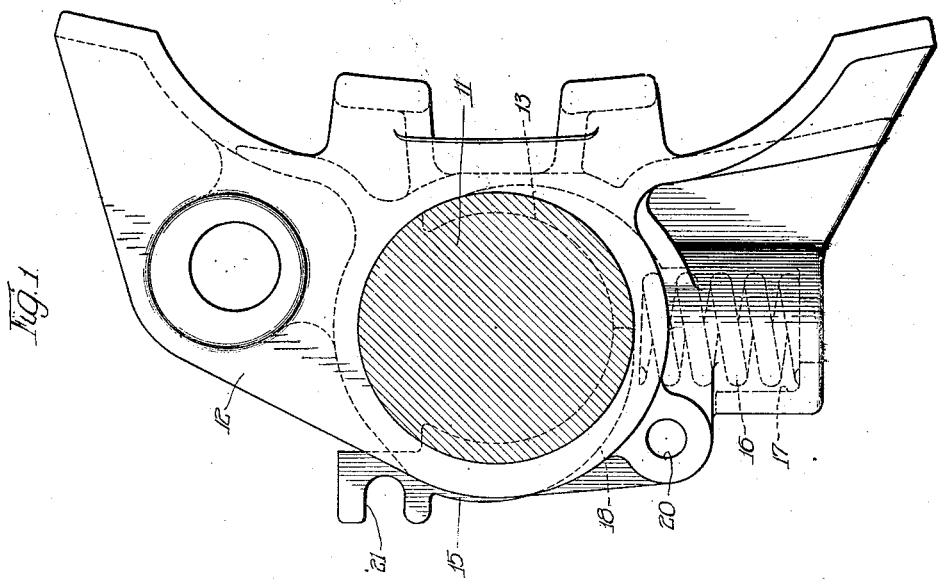
Witness:
R. Buckhardt
Inventor
William C. Hedgcock,
By Wilkinson, Huxley, Byron & Knight
attys May 20, 1924.  
W. C. HEDGCOCK  
1,494,837  
ADJUSTABLE BRAKE HEAD ARRANGEMENT  
Filed April 8, 1921  2 Sheets-Sheet 2
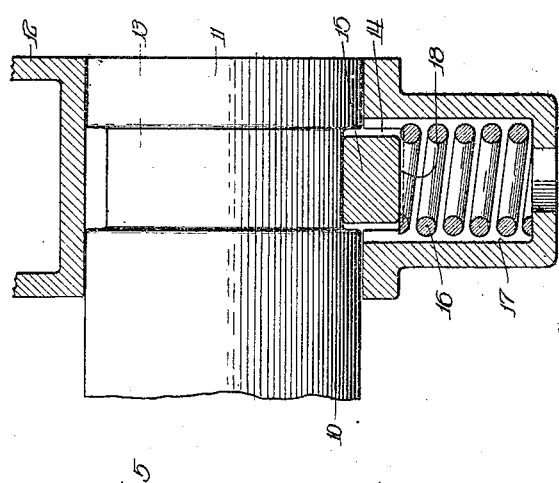
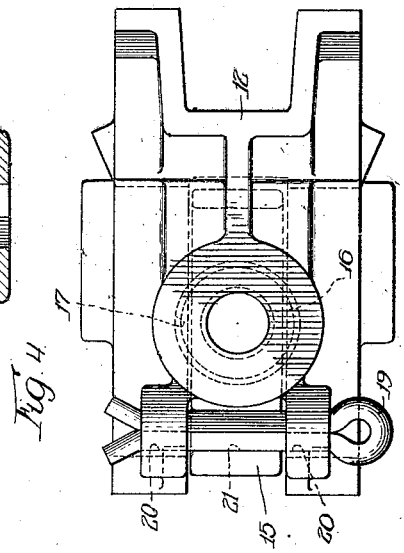
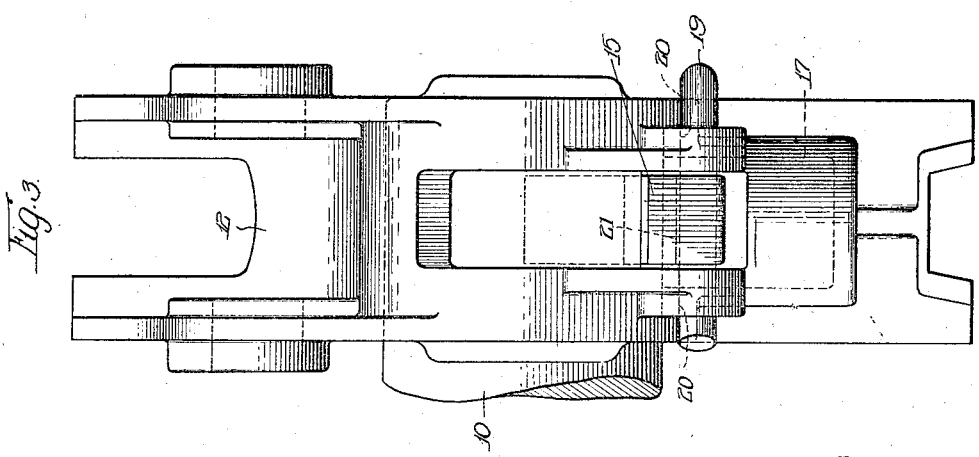
Witness:  
A. Burkhardt.
Inventor:  
William C. Hedgcock,  
By Wilkinson, Ainsley, Byron & Knight  
Attys Patented May 20, 1924.

1,494,837

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF ILLINOIS.

ADJUSTABLE BRAKE-HEAD ARRANGEMENT.

Application filed April 8, 1921. Serial No. 459,789.

*To all whom it may concern:*

Be it known that I, WILLIAM C. HEDGCOCK, a citizen of the United States, residing at Chicago, in the county of Cook and State of Illinois, have invented certain new and useful Improvements in Adjustable Brake-Head Arrangements, of which the following is a specification.

This invention relates to adjustable brake head arrangements.

One object of the invention is to provide an improved, simple, efficient and reliable adjustable brake head arrangement wherein the head is free at all times to rotate or move circumferentially on the brake beam sleeve or journal and be yieldably held in any automatically adjusted position in accordance with operating requirements for maintaining the braking surface of the brake shoe concentric with respect to the braking surface of an associated truck wheel and at the same time with the same parts prevent axial displacement of the head on the beam.

Another object is to provide such an arrangement above defined without the use of adjusting bolts, nuts, screws and other such parts which require more or less constant attention.

Another object is to provide an adjustable brake head arrangement adapted to meet all of the requirements for successful commercial operation.

These and other objects are accomplished by means of the arrangement disclosed on the accompanying sheets of drawings, in which—

Figure 1 is a side elevation of a brake head mounted on a brake beam shown in section and embodying my invention, the cam-shaped bearing block being shown in an inoperative position incident to assembling the parts;

Figure 2 is a similar side view with parts broken away and with the cam-shaped bearing block in operative position, wherein it compresses the spring and is yieldably held thereby in engagement with the brake head receiving part of the beam;

Figure 3 is a rear elevation of the arrangement shown in Figure 2;

Figure 4 is a bottom plan view of the same arrangement; and,

Figure 5 is a fragmentary sectional view taken in the plane of line 5—5 of Figure 2.

The various novel features of my invention will be apparent from the following description and drawings and will be particularly pointed out in the appended claims.

This invention is illustrated in connection with a brake beam 10 having a trunnion portion or sleeve 11 upon which is rotatably mounted a brake head 12. It is essential to efficient and economical operation that the brake head be automatically or self adjustable on the brake beam and properly held in adjusted position for maintaining the braking surface of the brake shoe in concentric relationship with the braking surface of the associated truck wheel and at the same time prevent the brake head from being accidentally withdrawn axially of the brake beam. To this end the sleeve 11 is provided with a groove 13 which may extend entirely around the sleeve or only partially so. In either event, however, said groove is of the same depth throughout its extent. The brake head has an associated groove 14 which is located only in the forward wall of the head and which is slightly tapered, as best shown in Figures 1 and 2. This taper, however, performs no function whatsoever. It is tapered only to prevent cutting through the front wall of the brake head, which otherwise would weaken the latter. Mounted in both of these grooves 13 and 14 is a bearing block 15 which, as best shown in Figure 5, prevents accidental withdrawal of the brake head axially from the brake beam 10. This bearing block 15, however, performs more important functions in that it compresses a coiled spring 16 mounted in a pocket 17 of the brake head, which spring in turn yieldably presses the bearing block 15 upwardly against the floor of the groove 13 in sleeve 11 for yieldably holding the brake head in adjusted position on the sleeve 11. It will be noted that the inner bearing surface of the block 15 is not corrugated or serrated but is plain, and that likewise the complementary engaging surface of the sleeve is plain, which permits the brake head automatically to position or adjust itself on the brake beam in accordance with operating requirements. That is to say, if the braking surface of a brake shoe carried by the brake head were slightly eccentric with respect to the braking surface of the associated truck wheel, said head upon an application of the brakes automatically would rotate a given amount on the sleeve in opposition to the frictional resistance offered as a result of engagement between the sleeve and block 15 caused by the spring 16 and then be held in such adjusted position as a result of such frictional resistance between the parts in question.

As shown in Figure 1 of the drawings, the bearing block 15 is in an inoperative position and it will be noted that the spring 16 is not in engagement with the tip of the block. The block 15 is shown in this position for the purpose of indicating the method of assembly. With the parts as shown in Figure 1, the brake beam may be rotated in a counterclockwise direction or the brake head rotated in a clockwise direction, the object being to have the proper relative movement between the brake head and brake beam for positioning the block 15, as shown in Figure 2. It will be noted that this bearing block 15 has a cam surface 18 which, during the relative movement mentioned, first engages the spring 16 and then compresses it for storing sufficient energy therein for yieldably pressing and holding the bearing block 15 in engagement with the floor 13 of the sleeve 11 for the purposes hereinabove described. It will be noted that the cam bearing block 15 does not engage the floor of groove 14 in the brake head, best shown in Figure 2, and it is absolutely essential to the operation of this device that such be the case, for if the cam bearing block 15 did engage the floor of the groove 14 in the brake head, it would become wedged or jammed between the brake head and sleeve and thereby prevent the brake head from being adjusted or automatically adjusted on the brake beam. For the reason mentioned, therefore, the spring when in engagement with the cam bearing block 15 at all times holds such block up into frictional engagement with the sleeve 11 for functioning in the manner described. To hold the frictional bearing block 15 in proper functioning position with respect to the brake head 12 a key 19 is passed through an opening 20 in the brake head and through an opening or slot 21 in one end of the bearing block 15.

It is my intention to cover all modifications of the invention falling within the spirit and scope of the following claims.

I claim:

1. In brake mechanism, the combination of a brake beam having a brake head receiving portion, a brake head rotatably mounted thereon, a spring carried by said brake head, and a block having a bearing portion and a cam portion, the latter portion for compressing said spring whereby said spring yieldably holds the bearing surface of said block in engagement with said brake head receiving portion for yieldably maintaining said head in adjusted position.

2. In brake mechanism, the combination of a brake beam having a brake head receiving portion with a groove therein, a brake head rotatably mounted thereon, compression means carried by said brake head, and a member carried by said brake head having one portion for compressing said compression means and another portion for engaging the groove in said brake beam, said compression means yieldably holding said member against said brake beam for yieldably holding the brake head in adjusted position.

3. In brake mechanism, the combination of a brake beam, a brake head rotatably mounted thereon, said head and beam having complementary grooved portions therein, a spring carried by said brake head, a member mounted in said grooves for preventing axial displacement of the head with respect to the beam, said member having a cam portion for compressing the spring and a bearing portion for engaging the floor of the groove in the brake beam which engagement is maintained by said spring for yieldably holding the brake head in adjusted position.

4. In brake mechanism, the combination of a brake beam having a brake head receiving portion, a brake head rotatably mounted thereon, a spring carried by said brake head, a member having a bearing portion and a cam portion, the latter portion for compressing said spring whereby the spring yieldably holds the bearing surface of said member in engagement with said brake head receiving portion for yieldably maintaining said head in adjusted position, and means for preventing displacement of said member with respect to said head.

5. In brake mechanism, the combination of a brake beam having a brake head receiving portion, a brake head rotatably mounted thereon, a spring carried by said brake head, and means having a bearing portion and a cam portion, the latter portion for compressing said spring whereby the spring yieldably holds the bearing surface of said means in engagement with said brake head receiving portion for yieldably maintaining said head in adjusted position.

6. In brake mechanism, the combination of a brake beam having a brake head receiving portion, a brake head rotatably mounted thereon, a spring carried by said brake head, means having a bearing portion and a cam portion, the latter portion for compressing said spring whereby the spring yieldably holds the bearing surface of said means in engagement with said brake head receiving portion for yieldably maintaining said head in adjusted position, and means for preventing displacement of said bearing and cam means with respect to said head.

Signed at Chicago, Illinois, this 31st day of March, 1921.

WILLIAM C. HEDGCOCK.